(12) United States Patent
Wahler et al.

(10) Patent No.: US 8,073,443 B2
(45) Date of Patent: Dec. 6, 2011

(54) SIP CLIENT-BASED LOCAL NUMBER PORTABILITY THROUGH AN AIRCRAFT AIR-TO-GROUND LINK

(75) Inventors: Ron Wahler, Boulder, CO (US); John Wade, Broomfield, CO (US); Lance Anderson, Niwot, CO (US); Alan Mak, Boulder, CO (US)

(73) Assignee: GoGo LLC, Itasca, IL (US)

( * ) Notice: Subject to any disclaimer, the term of this patent is extended or adjusted under 35 U.S.C. 154(b) by 310 days.

(21) Appl. No.: 12/423,555

(22) Filed: Apr. 14, 2009

(65) Prior Publication Data
US 2009/0197596 A1 Aug. 6, 2009

Related U.S. Application Data

(63) Continuation of application No. 10/730,329, filed on Dec. 7, 2003, now Pat. No. 7,113,780, which is a continuation-in-part of application No. 09/686,923, filed on Oct. 11, 2000, now Pat. No. 6,788,935, which is a continuation-in-part of application No. 09/379,825, filed on Aug. 24, 1999, now Pat. No. 6,408,180.

(51) Int. Cl.
H04W 4/00 (2009.01)
H04M 3/42 (2006.01)

(52) U.S. Cl. ......... 455/431; 455/430; 455/417; 455/415

(58) Field of Classification Search .................. 455/431, 455/422.1, 417, 430, 415, 414.2; 370/356, 370/316, 310; 379/142; 701/16, 1
See application file for complete search history.

(56) References Cited

U.S. PATENT DOCUMENTS

| | | | |
|---|---|---|---|
| 3,659,085 A | 4/1972 | Potter et al. |
| 4,115,777 A | 9/1978 | Taylor |
| 4,654,867 A | 3/1987 | Labedz et al. |
| 5,042,027 A | 8/1991 | Takase et al. |

(Continued)

FOREIGN PATENT DOCUMENTS

| WO | WO-0146822 A1 | 6/2001 |
|---|---|---|
| WO | WO-2006128946 A1 | 12/2006 |
| WO | WO-2008048742 A1 | 4/2008 |

OTHER PUBLICATIONS

In the US Patent and Trademark Office in re: U.S. Appl. No. 09/379,825, Non-Final Office Action dated May 11, 2001, number of pages unknown; and corresponding response dated May 29, 2001, number of pages unknown.

(Continued)

*Primary Examiner* — Kiet Doan
(74) *Attorney, Agent, or Firm* — Patton Boggs LLP

(57) ABSTRACT

The SIP Number Portability System disables the cellular radios in the wireless device and enables a WiFi 802.11 protocol-based radio. In the airborne mode, it activates a call forwarding registration process which has calls to the subscriber's publicly available phone number forwarded to the Airborne Session Initiated Protocol client through a SIP-based Public Switched Telephone Network access number and incoming communication sessions directed to the subscriber's wireless service provider user address routed to the Airborne Session Initiated Protocol client through a SIP-based data gateway on the Internet or the Public Switched Data Network. On outbound calls, the Airborne Session Initiated Protocol Client populates the Calling Number field with the wireless subscriber device phone number so that the caller ID display located at the called party's subscriber device shows the subscriber's publicly available phone number.

12 Claims, 4 Drawing Sheets

U.S. PATENT DOCUMENTS

| | | | |
|---|---|---|---|
| 5,123,112 | A | 6/1992 | Choate |
| 5,134,709 | A | 7/1992 | Bi et al. |
| 5,212,804 | A | 5/1993 | Choate |
| 5,408,515 | A | 4/1995 | Bhagat et al. |
| 5,432,841 | A | 7/1995 | Rimer |
| 5,519,761 | A | 5/1996 | Gilhousen |
| 5,543,779 | A | 8/1996 | Aspesi et al. |
| 5,555,444 | A | 9/1996 | Diekelman et al. |
| 5,590,395 | A | 12/1996 | Diekelman |
| 5,651,050 | A | 7/1997 | Bhagat et al. |
| 5,659,304 | A | 8/1997 | Chakraborty |
| 5,678,174 | A | 10/1997 | Tayloe |
| 5,740,535 | A | 4/1998 | Rune |
| 5,754,959 | A | 5/1998 | Ueno et al. |
| 5,805,683 | A | 9/1998 | Berberich, Jr. |
| 5,826,188 | A | 10/1998 | Tayloe et al. |
| 5,832,380 | A | 11/1998 | Ray et al. |
| 5,848,359 | A | 12/1998 | Furtaw |
| 5,887,258 | A | 3/1999 | Lemozit et al. |
| 5,950,129 | A * | 9/1999 | Schmid et al. ............... 455/431 |
| 5,956,644 | A | 9/1999 | Miller et al. |
| 5,995,805 | A | 11/1999 | Ogasawara et al. |
| 5,995,833 | A | 11/1999 | Zicker |
| 6,002,944 | A | 12/1999 | Beyda |
| 6,009,330 | A | 12/1999 | Kennedy, III et al. |
| 6,040,781 | A | 3/2000 | Murray |
| 6,055,425 | A | 4/2000 | Sinivaara |
| 6,104,926 | A | 8/2000 | Hogg et al. |
| 6,144,338 | A | 11/2000 | Davies |
| 6,195,529 | B1 | 2/2001 | Linz et al. |
| 6,233,448 | B1 * | 5/2001 | Alperovich et al. .......... 455/417 |
| 6,263,206 | B1 | 7/2001 | Potochniak et al. |
| 6,304,762 | B1 | 10/2001 | Myers et al. |
| 6,314,286 | B1 | 11/2001 | Zicker |
| 6,321,084 | B1 * | 11/2001 | Horrer ......................... 455/431 |
| 6,324,398 | B1 | 11/2001 | Lanzerotti et al. |
| 6,353,734 | B1 | 3/2002 | Wright et al. |
| 6,392,692 | B1 | 5/2002 | Monroe |
| 6,393,281 | B1 | 5/2002 | Capone et al. |
| 6,418,327 | B1 | 7/2002 | Carey et al. |
| 6,430,412 | B1 | 8/2002 | Hogg et al. |
| 6,545,601 | B1 | 4/2003 | Monroe |
| 6,577,419 | B1 | 6/2003 | Hall et al. |
| 6,580,915 | B1 | 6/2003 | Kroll |
| 6,615,052 | B1 | 9/2003 | Parmenter |
| 6,690,928 | B1 | 2/2004 | Konishi et al. |
| 6,735,438 | B1 | 5/2004 | Sabatino |
| 6,735,500 | B2 | 5/2004 | Nicholas et al. |
| 6,741,841 | B1 | 5/2004 | Mitchell |
| 6,754,489 | B1 | 6/2004 | Roux |
| 6,757,712 | B1 | 6/2004 | Bastian et al. |
| 6,760,778 | B1 | 7/2004 | Nelson et al. |
| 6,788,935 | B1 | 9/2004 | McKenna et al. |
| 6,799,037 | B1 | 9/2004 | Mielke et al. |
| 6,880,750 | B2 | 4/2005 | Pentel |
| 6,889,042 | B2 | 5/2005 | Rousseau et al. |
| 6,937,597 | B1 * | 8/2005 | Rosenberg et al. ........... 370/356 |
| 7,050,755 | B2 | 5/2006 | Kline |
| 7,062,268 | B2 | 6/2006 | McKenna |
| 7,107,062 | B2 | 9/2006 | Cruz et al. |
| 7,280,535 | B1 | 10/2007 | Bergman et al. |
| 2002/0010633 | A1 | 1/2002 | Brotherston |
| 2002/0045444 | A1 | 4/2002 | Usher et al. |
| 2002/0059614 | A1 | 5/2002 | Lipsanen et al. |
| 2002/0090931 | A1 | 7/2002 | Papineau et al. |
| 2002/0123344 | A1 | 9/2002 | Criqui et al. |
| 2002/0155833 | A1 | 10/2002 | Borel |
| 2003/0032426 | A1 | 2/2003 | Gilbert et al. |
| 2003/0050746 | A1 | 3/2003 | Baiada et al. |
| 2003/0055975 | A1 | 3/2003 | Nelson et al. |
| 2003/0084108 | A1 | 5/2003 | Syed |
| 2003/0093187 | A1 | 5/2003 | Walker |
| 2004/0063433 | A1 | 4/2004 | Garrison |
| 2004/0102188 | A1 * | 5/2004 | Boyer et al. ............... 455/422.1 |
| 2004/0137840 | A1 | 7/2004 | La Chapelle et al. |
| 2004/0142658 | A1 | 7/2004 | McKenna et al. |
| 2004/0203918 | A1 | 10/2004 | Moriguchi et al. |
| 2005/0071076 | A1 | 3/2005 | Baiada et al. |
| 2005/0216938 | A1 | 9/2005 | Brady et al. |
| 2005/0221875 | A1 | 10/2005 | Grossman et al. |
| 2006/0009262 | A1 | 1/2006 | Hamm |
| 2006/0048196 | A1 | 3/2006 | Yau |
| 2006/0064746 | A1 | 3/2006 | Aaron et al. |
| 2007/0021117 | A1 | 1/2007 | McKenna et al. |
| 2007/0042772 | A1 | 2/2007 | Salkini et al. |
| 2007/0087756 | A1 | 4/2007 | Hoffberg |
| 2007/0105600 | A1 | 5/2007 | Mohanty et al. |
| 2007/0274294 | A1 | 11/2007 | Sasaki et al. |
| 2007/0281682 | A1 | 12/2007 | Raju et al. |
| 2008/0070601 | A1 | 3/2008 | Brueckheimer et al. |
| 2008/0090546 | A1 | 4/2008 | Dickinson et al. |
| 2009/0016339 | A1 | 1/2009 | Tanizawa et al. |

OTHER PUBLICATIONS

In the US Patent and Trademark Office in re: U.S. Appl. No. 09/686,923, Non-Final Office Action dated Jul. 8, 2003, number of pages unknown; and corresponding response dated Sep. 29, 2003, number of pages unknown.

In the US Patent and Trademark Office in re: U.S. Appl. No. 09/686,923, Final Office Action dated Dec. 2, 2003, number of pages unknown; corresponding response dated Jan. 9, 2004, number of pages unknown; and supplemental response dated Feb. 20, 2004, number of pages unknown.

In the US Patent and Trademark Office in re: U.S. Appl. No. 10/730,329, Non-Final Office Action dated May 18, 2005, 9 pages; and corresponding response dated Aug. 18, 2005, 34 pages.

In the US Patent and Trademark Office in re: U.S. Appl. No. 10/730,329, Final Office Action dated Nov. 25, 2005, 16 pages; corresponding response dated Jan. 25, 2006; supplemental response dated Feb. 17, 2006; additional supplemental response dated Mar. 27, 2006; and additional supplemental response with RCE dated Apr. 14, 2006.

In the US Patent and Trademark Office in re: U.S. Appl. No. 11/492,545, Final Office Action dated Dec. 19, 2008, 18 pages; corresponding response dated Jan. 27, 2009, 34 pages; and supplemental response dated Apr. 17, 2009, 35 pages.

In the US Patent and Trademark Office in re: U.S. Appl. No. 11/492,545, Non-Final Office Action dated Aug. 7, 2008, 19 pages; and corresponding response dated Oct. 10, 2008, 29 pages.

In the US Patent and Trademark Office in re: U.S. Appl. No. 11/492,545, Non-Final Office Action dated Jun. 10, 2009, 20 pages; and corresponding response dated Sep. 3, 2009, 32 pages.

In the US Patent and Trademark Office in re: U.S. Appl. No. 11/590,146, Non-Final Office Action dated Sep. 24, 2008, 12 pages; and corresponding response dated Jan. 29, 2009, 13 pages.

In the US Patent and Trademark Office in re: U.S. Appl. No. 11/590,146, Final Office Action dated Mar. 31, 2009, 9 pages; and corresponding response dated May 29, 2009, 16 pages.

In the US Patent and Trademark Office in re: U.S. Appl. No. 12/021,133, Non-Final Office Action dated Jun. 18, 2009, 14 pages; and corresponding response dated Sep. 9, 2009.

In the US Patent and Trademark Office in re: U.S. Appl. No. 12/021,169, Non-Final Office Action dated Jul. 14, 2009, 10 pages.

In the US Patent and Trademark Office in re: U.S. Appl. No. 12/060,674, Non-Final Office Action dated Jul. 9, 2009, 14 pages.

In the US Patent and Trademark Office in re: U.S. Appl. No. 12/182,834, Non-Final Office Action dated Jul. 8, 2009, 13 pages.

Casewell, I.E.; "The Provision of GSM Cellular Radio Environments With Passenger Aircraft Operating Over Europe"; IEEE Fifth International Conference; Dec. 11-14, 1989; pp. 172-176.

Li et al.; "Airborne Operation of Portable Electronic Devices"; IEEE Antenna's and Propagation Magazine; vol. 44, No. 4; Aug. 2002; pp. 30-39.

Papavramidis et al.; "Adaptation of Land Mobile Systems for Onboard Operation"; IEEE Conference; 1993; pp. 258-263.

Uhlirz; "Concept of a GSM-based Communication System for High-Speed Trains"; 1994 IEEE 44th Vehicular Technology Conference; Stockholm; Jun. 8-10, 1994; pp. 1130-1134.

* cited by examiner

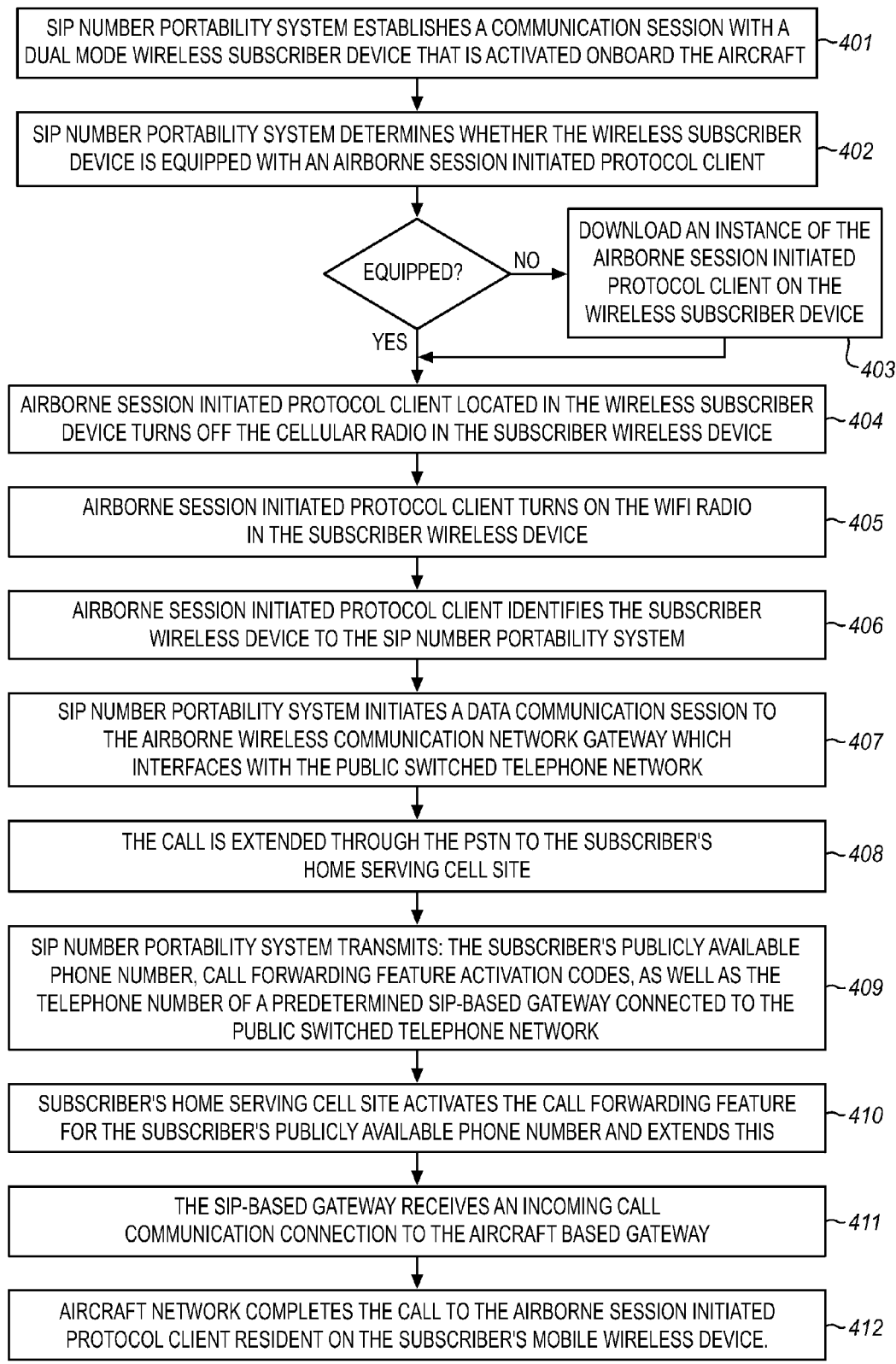

SIP CLIENT-BASED LOCAL NUMBER PORTABILITY THROUGH AN AIRCRAFT AIR-TO-GROUND LINK

CROSS REFERENCE TO RELATED APPLICATIONS

This application is a continuation of U.S. Pat. No. 7,113,780, which is a continuation-in-part of U.S. Pat. No. 6,788,935 issued Sep. 7, 2004; which is a continuation-in-part of U.S. Pat. No. 6,408,180 issued Jun. 18, 2002.

FIELD OF THE INVENTION

This invention relates to wireless communications in an aircraft environment and, in particular, to a system that enables wireless subscriber stations to receive consistent wireless communication services in both the terrestrial (ground-based) and non-terrestrial regions, as well as in other areas not served by existing cellular communication networks.

Problem

It is a problem in the field of wireless communications to manage the maintenance of the services provided to the wireless subscriber as they roam among cell sites in the cellular communication network. This ability to provide wireless mobility requires that the wireless subscriber has continual access to the Public Switched Telephone Network (PSTN), the Public Switched Data Network (PSDN), and the Internet, independent of the wireless subscriber's location. In addition, the wireless subscriber should have the ability to both originate and receive calls and/or data messages in a unified manner, regardless of their location, and these calls, as well as any ancillary services, should be handled uniformly by whatever wireless system is presently serving the wireless subscriber. This problem is especially pertinent in cases where wireless subscribers are located in an environment that is not included in the intended service area of terrestrial wireless systems, such as in aircraft or on off-shore ships.

If the wireless subscriber transitions inter-network, from the coverage area of their home wireless network to a network of the same or another wireless service provider (termed "roaming wireless service provider" herein), the wireless subscriber should have the ability to originate and receive calls in a unified manner, regardless of their location. However, when wireless subscribers enter the non-terrestrial space and fly in an aircraft, it is presently not feasible for a subscriber to enjoy transparent or seamless telephone number or wireless service provider user address portability. The wireless subscriber is in a communication vacuum—that is, connectivity for telephony, text message and Internet/data access through their personal wireless subscriber device using their existing telephone number or wireless service provider user address is no longer possible.

Furthermore, the existing wireless networks do not have the capability for transparent billing solutions when a subscriber becomes "non-terrestrial". This very simple customer-centric feature is necessary to ensure timely market adoption of non-terrestrial service.

Solution

The above described problems are solved and a technical advance achieved in the field by the present SIP Client-based Local Number Portability Through An Aircraft Air-To-Ground Link (termed "SIP Number Portability System" herein), which operates in an Airborne Wireless Communication Network and enables wireless subscriber devices that are provisioned with a telephone number and/or wireless service provider user address (collectively termed "subscriber home communication address"), to roam in a transparent and seamless manner to a non-terrestrial wireless network.

The SIP Number Portability System includes a customized Airborne Session Initiated Protocol ("SIP") Client (termed "ASIP" herein) which is installed in the subscriber's mobile cellular device or WiFi device to enable the subscriber's mobile cellular device or WiFi device to interface with the wireless network located in the aircraft (termed "aircraft wireless network" herein) which is part of the Airborne Wireless Communication Network and serves to connect the subscriber's wireless devices to ground-based communication networks via the aircraft's Air-To-Ground (ATG) Link, which is also part of the Airborne Wireless Communication Network. The customized Airborne Session Initiated Protocol Client software facilitates local number portability using SIP, WiFi 802.11, and Ethernet protocols in an airborne environment. This SIP Number Portability System allows a user of a combined cellular (GSM or CDMA) and WiFi device (collectively termed "subscriber wireless device" herein) via the Airborne Session Initiated Protocol Client to make and receive phone calls and SMS "short messaging services," as well as access other cellular and wireless features using their standard publicly available phone number and/or wireless service provider user address while located on an aircraft and using the aircraft's Air-To-Ground link to access the Public Switched telephone Network.

The Airborne Session Initiated Protocol Client software is either integrated into a subscriber wireless device as part of the standard factory installed software or can be a standalone application which is dynamically loaded on to the subscriber wireless device. The Airborne Session Initiated Protocol Client provides a call mode that automatically disables the standard GSM or CDMA cellular radios in the subscriber wireless device and enables a WiFi 802.11 protocol-based radio when the wireless subscriber device is active inside of an airborne aircraft. The Airborne Session Initiated Protocol application then integrates standard cellular features into a SIP-based airborne communication application and directs all communications to the aircraft wireless network and an Aircraft-based gateway located on the aircraft. The Airborne Session Initiated Protocol Client initiates a subscriber wireless device registration process by communicating a call forwarding request through an Aircraft-based gateway, through the Broadband or Narrowband Air-To-Ground Link from the aircraft to a ground based SIP gateway which integrates the Air-To-Ground communications into the Public Switched Telephone Network (PSTN), the Public Switched Data Network (PSDN), or the Internet.

When the Airborne Session Initiated Protocol Client is placed in an airborne mode, it automatically activates a call forwarding registration process to activate the Home Location Register in the subscriber's serving cellular network and/or the data router in the subscriber's wireless service provider to route incoming calls which are directed to the subscriber's home communication address, to a predefined SIP-based gateway which is part of the SIP Number Portability System. Thus, calls to the subscriber's publicly available phone number are forwarded to the Airborne Session Initiated Protocol Client through a SIP based Public Switched Telephone Network access number of the Airborne Wireless Communication Network. In addition, incoming messages directed to the subscriber's wireless service provider user address are routed to the Airborne Session Initiated Protocol Client through a SIP based data gateway of the Airborne Wireless Communication Network which is connected to the Internet or the Public Switched Data Network. On outbound calls, the Airborne Session Initiated Protocol Client populates the Calling Number field with the wireless subscriber device phone number so that a caller ID device located at the called party's subscriber device shows the subscriber's publicly available phone number. The Airborne Session Initiated Protocol Client also has the ability to re-enable the standard cellular service by turning off the aircraft mode once the aircraft is no longer in flight.

BRIEF DESCRIPTION OF THE DRAWINGS

FIG. 4 illustrates, in flow diagram form, the operation of the SIP Number Portability System.

DETAILED DESCRIPTION

Figure 1:
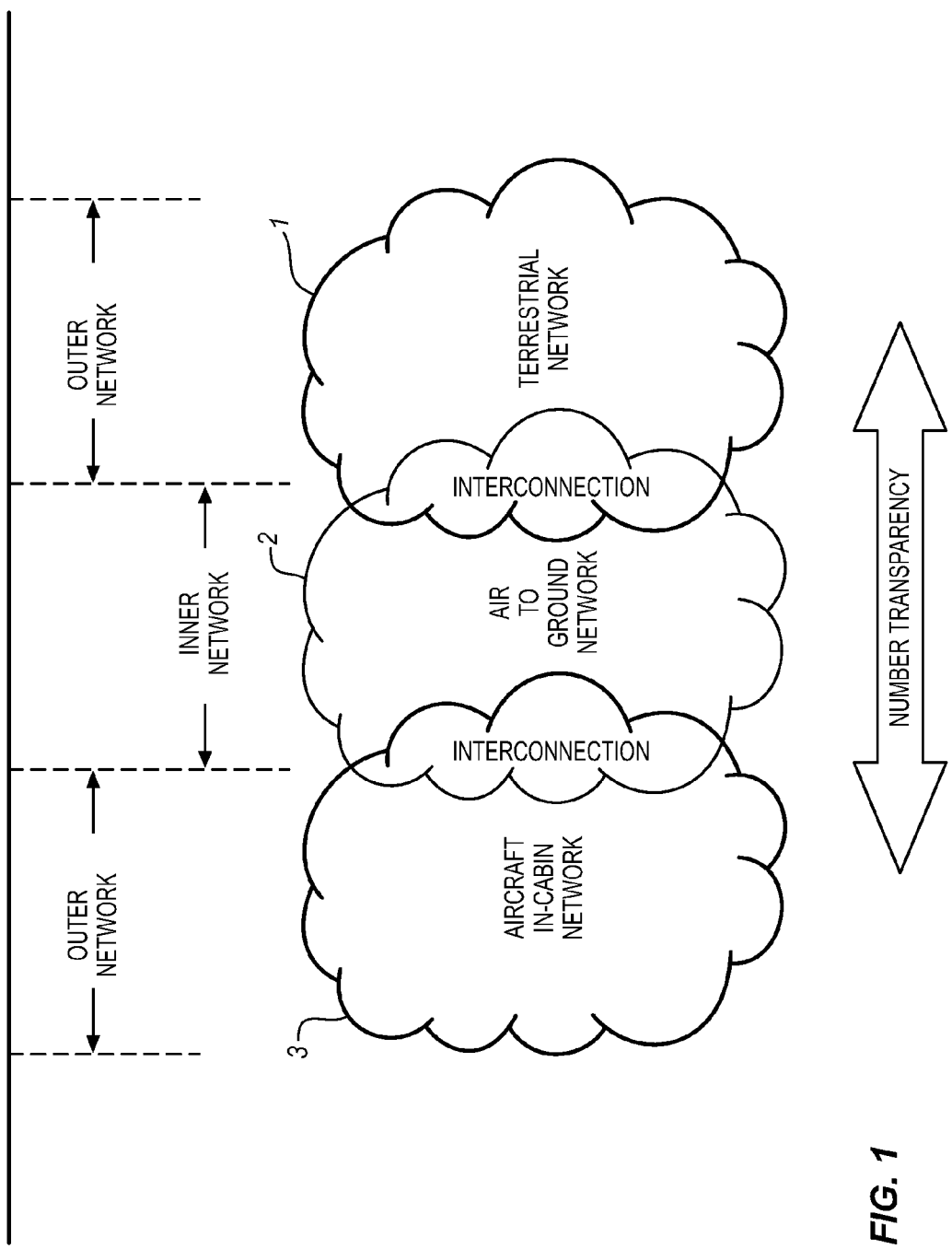
FIG. 1 illustrates, in block diagram form, the overall architecture of an Airborne Wireless Communication Network which includes an Air-To-Ground Network that interconnects an Aircraft Wireless Network with a Ground-Based Communication Network.

Cellular wireless communication systems provide the service of connecting wireless communication customers, each having a mobile wireless subscriber device, to land-based customers who are served by the common carrier public telephone network, and other wireless communication customers, as well as to the destination sites on the Internet. In such a system, if the traffic is circuit switched, all incoming and outgoing calls are routed through a wireless network switch, commonly referred to as a Mobile Switching Center (MSC) or Mobile Telephone Switching Office (MTSO), each of which is connected to a Base Station Subsystem consisting of one or more Base Station Controllers (BSCs), and a plurality of Base Transceiver Stations (BTSs). Each Base Transceiver Station communicates with mobile wireless subscriber devices located within its service area, with the Base Transceiver Stations geographically arranged to collectively provide contiguous service over a large service region. Each Base Transceiver Station in the service region is connected by communication links to a Base Station Controller, and the Base Station Controller is connected by additional communications links to the Mobile Switching Center. Each Base Transceiver Station contains a one or more radio transceivers, with the number of transceivers being dependent upon the subscriber traffic generated within the coverage area of the Base Transceiver Station.

The terms "cell site" and "cell" are sometimes loosely used in the literature, and the term "cell site" generally denotes the locations of the Base Transceiver Stations, while the term "cell" generally denotes the region of space which is served by a particular set of transceivers and associated antenna system at a cell site. A "sector" generally refers to the sector-shaped coverage area created when multiple directional antenna systems are used at a cell site to provide greater capacity and/or coverage by sub-dividing the nominally circular coverage area surrounding a cell site into a corresponding number of cells. The technology used to implement communications between wireless subscriber devices and the transmitter-receiver pairs as well as the nature of the data transferred there between, be it voice, video, telemetry, computer data, and the like, are not limitations to the system which is described herein, since a novel system concept is disclosed, rather than a specific technologically limited implementation of an existing system concept. Therefore, the term "cellular" as it is used herein denotes a communication system which operates on the basis of dividing space into a plurality of volumetric sections or cells, and managing communications between wireless subscriber devices located in the cells and the associated transmitter-receiver pairs located at the cell site for each of these cells.

Call Connection

The first stage of a cellular communication connection is set up when a transmitter-receiver pair in a cell site, operating on a predetermined pair of radio frequencies, is turned on and a wireless subscriber device is tuned to the same pair of radio frequencies. The second stage of the communication connection is between this transmitter-receiver pair and the network interface that connects to the common carrier public telephone network or to another wireless communications system. This second stage of the communication connection is set up in the SSS (Switching Subsystem), which is connected to other networks by incoming and outgoing trunks and data connections. The Mobile Switching Center contains a switching network to switch mobile customer voice signals from the communication link to an incoming or outgoing trunk. A data switching node (PDSN—Packet Data Serving Node—in CDMA systems, or GGSN—Gateway GPRS Support Node—in GSM systems) similarly directs data traffic interconnecting to the Public Switched Data Network (PSDN) or to other data networks. The Mobile Switching Center controls the actions of the associated Base Station Controllers by generating and interpreting the control messages that are exchanged over data links between the two. The Base Station Controllers at each cell site, in response to control messages from the Mobile Switching Center, control the transmitter-receiver pairs at the cell site (or code word assignment in the case of CDMA). The control processes at each cell site also control the tuning of the wireless subscriber devices to the selected RF channels, time slots and/or code words.

However, when wireless subscribers enter the non-terrestrial space, that is they fly in an aircraft, it is presently not feasible for a subscriber to enjoy transparent or seamless number or wireless service provider portability. The wireless subscriber is in a communication vacuum—that is, connectivity for telephony, text message and Internet/data access through their personal wireless subscriber device using their existing phone number or wireless service provider user address is no longer possible. This is due to the fact that the identity of the subscriber's mobile cellular device phone number or WiFi device wireless service provider user address and the present location of the wireless subscriber device on the aircraft are not available to the terrestrial networks. Therefore, calls and data communications directed to the airborne wireless subscriber cannot be completed.

Overall System Architecture

Figure 2:
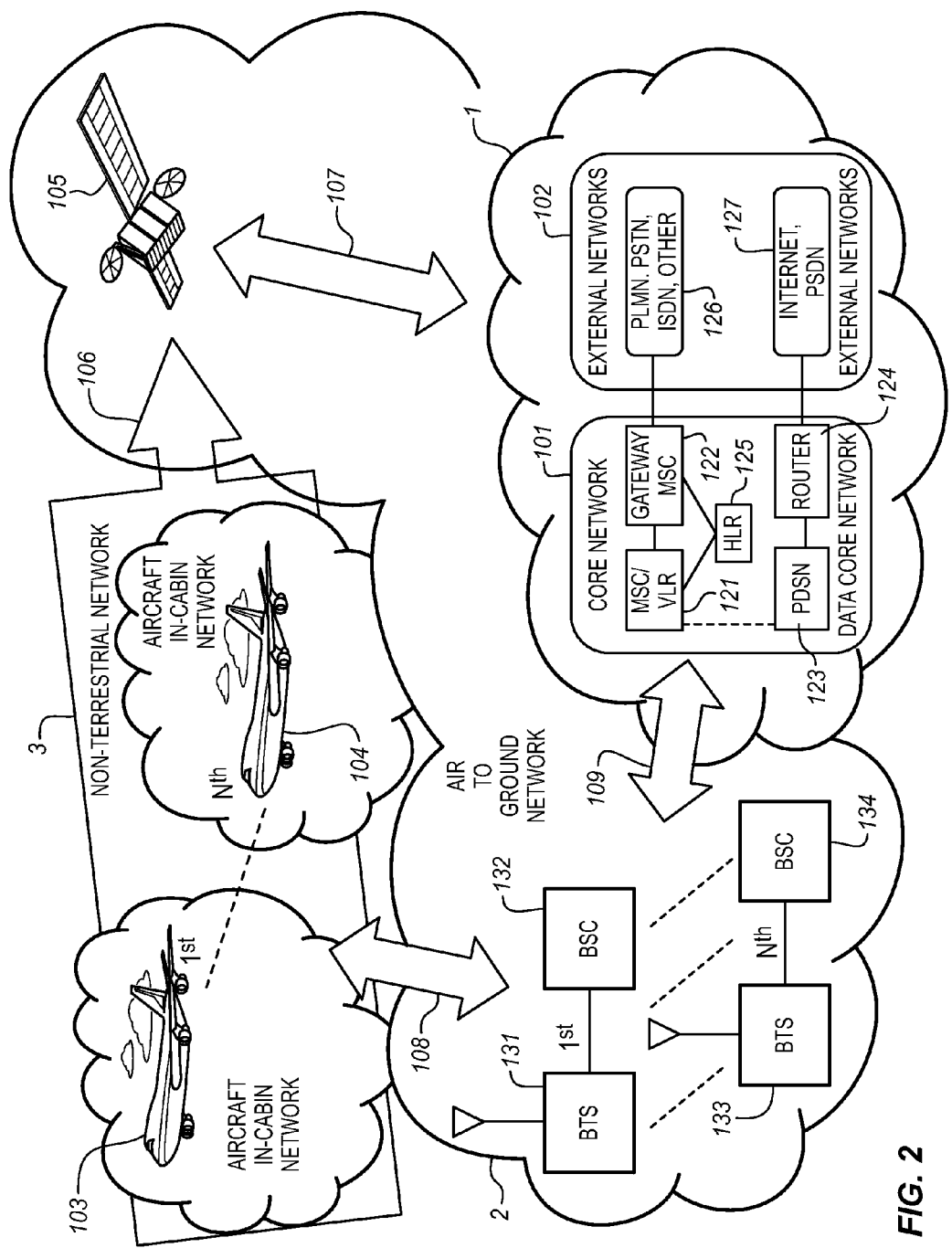
FIG. 2 illustrates, in block diagram form, additional details of the Air-to-Ground Network that interconnects an Aircraft Wireless Network with a Ground-Based Communication Network.

FIG. 1 illustrates, in block diagram form, the overall architecture of an Airborne Wireless Communication Network which includes an Air-to-Ground Network 2 that interconnects an Aircraft Wireless Network 3 with the Terrestrial Network 1 and FIG. 2 illustrates, in block diagram form, additional details of the Air-to-Ground Network 2 that interconnects an Aircraft Wireless Network 3 with a Terrestrial Network 1. The Airborne Wireless Communication Network illustrated in FIGS. 1 and 2 provides an "Inner Network" that connects the two segments of the "Outer Network," comprising the Aircraft Wireless Network 3 and the Terrestrial Network 1. This is accomplished by the Inner Network transmitting both the subscriber traffic (comprising voice and/or other data) as well as control information between the Aircraft Wireless Network 3 and the Terrestrial Network 1 to thereby enable the wireless subscriber devices that are located in the aircraft 103, 104 to receive services in non-terrestrial regions that are consistent with wireless communication services in the terrestrial (ground-based) networks. The Air-to-Ground Network 2 comprises a set of Base Transceiver Stations 131, 133 and associated Base Station Controllers 132, 134 that are operated by the non-terrestrial cellular service provider and which are connected to the cellular network 101 and thence to the wire-line network 102 of the ground-based (Terrestrial) Network 1.

The cellular network 101 consists of the traditional elements and for the purpose of illustration, is illustrated in pertinent part as consisting of two segments: Core network and Data Core network. The Core Network includes a Mobile Switching Center 121 with its associated Visited Location Register, which is connected to the Home Location Register 125 and the Aircraft PSTN Gateway 122. The Core Network provides interconnection of the voice traffic to the voice transmission segment of the wire-line network 102 which includes various components, including, but not limited to: Public Land Mobile Network, Public Switched Telephone Network, Integrated Services Digital Network, and other such functionalities. The Data Core Network is comprised of the Packet Data Switched Network 123, which is connected to a Router 124, which provides interconnection of the data traffic to the data transmission segments of the wire-line network 102 which includes various components, including, but not limited to: Internet, Public Switched Data Network, and other such functionalities.

Thus, the non-terrestrial cellular communications between the wireless subscriber devices located in aircraft 103, 104 and the cellular network 101 and wire-line network 102 segments of the Terrestrial Network 1 are transported via the Airborne Wireless Communication Network from the Aircraft Wireless Network 3 to the Air-to-Ground Network 2 and thence to the ground-based Base Transceiver Stations 131-133 and associated Base Station Controllers 132, 134 of the non-terrestrial cellular communication network.

Air-to-Ground Network

The Air-to-Ground Network 2 shown in FIGS. 1 and 2 is clearly one that is based on wireless communications (radio frequency or optical) between the ground-based cellular communications network 101 and the wireless subscriber devices that are located in the aircraft 103, 104, with the preferred approach being that of a radio frequency connection 108, 109. This radio frequency connection 108 takes on the form of a cellular topology where typically more than one cell describes the geographic footprint or coverage area of the composite Air-to-Ground Network 2. The air-to ground connection carries both subscriber traffic as well as native network signaling traffic.

Alternatively, the Air-to-Ground Network 2 could be achieved through a wireless satellite connection 105-107 where radio frequency links 106, 107 are established between the aircraft 103, 104 and a satellite 105 and between the satellite 105 and the ground-based cellular communications network 101, respectively. These satellites 105 could be geosynchronous (appears to be stationary from an earth reference point) or moving, as is the case for Medium Earth Orbit (MEO) and Low Earth Orbit (LEO). Examples of satellites include but are not limited to: Geosynchronous Ku Band satellites, DBS satellites (Direct Broadcast Satellite), the Iridium system, the Globalstar system, and the Inmarsat system. In the case of specialized satellites, such as those used for Direct Broadcast Satellite, the link is typically unidirectional, that is from the satellite to the receiving platform, in this case an aircraft. In such a system, a link transmitting unidirectionally from the aircraft is needed to make the communication bidirectional. This link could be satellite or ground-based wireless in nature as previously described. Last, other means for communicating to aircraft include broad or wide area links such as HF (High Frequency) radio and more unique systems such as troposcatter architectures.

The Air-to-Ground Network 2 can be viewed as the conduit through which the subscriber traffic as well as the control data is transported between the Terrestrial Network 1 and the Aircraft Wireless Network 3. The Air-to-Ground Network 2 can be implemented as a single radio frequency link or multiple radio frequency links, with a portion of the signals being routed over different types of links, such as the Air to Ground Link 108 and the Satellite Link 105-107. Thus, there is a significant amount of flexibility in the implementation of this system, using the various components and architectural concepts disclosed herein in various combinations.

Aircraft Wireless Network

The "Aircraft Wireless Network" is the communications environment that is implemented in the aircraft 103, 104, and these communications can be based on various technologies, including but not limited to: wired, wireless, optical, acoustic (ultrasonic) and the like. An example of such a network is disclosed in U.S. Pat. No. 6,788,935, issued 7 Sep. 2004 and titled "Aircraft-Based Network for Wireless Subscriber Stations."

The Aircraft Wireless Network 3 uses wireless technology which is native to the wireless subscriber devices that passengers and crew carry on the aircraft. The objective on the Aircraft Wireless Network 3 is to enable seamless and ubiquitous access to the Aircraft Wireless Network 3 for all wireless subscriber devices that are carried by passengers and crew.

The implementation of the Air-to-Ground Network 2 is selected based on a number of operational parameters which include but are not limited to: cost (least cost routing), availability, reliability, bandwidth, redundancy and so on. The air-to-ground link could be via wireless cellular 108, 109 or it could be via satellite 105-107. For a satellite based air-to-ground connection, as described previously, the satellite 105 could be a specific platform such as Iridium, or it could be multiple satellite platforms (for example, DBS and geosynchronous Ku band). A typical topology is shown in FIG. 2.

Figure 3:
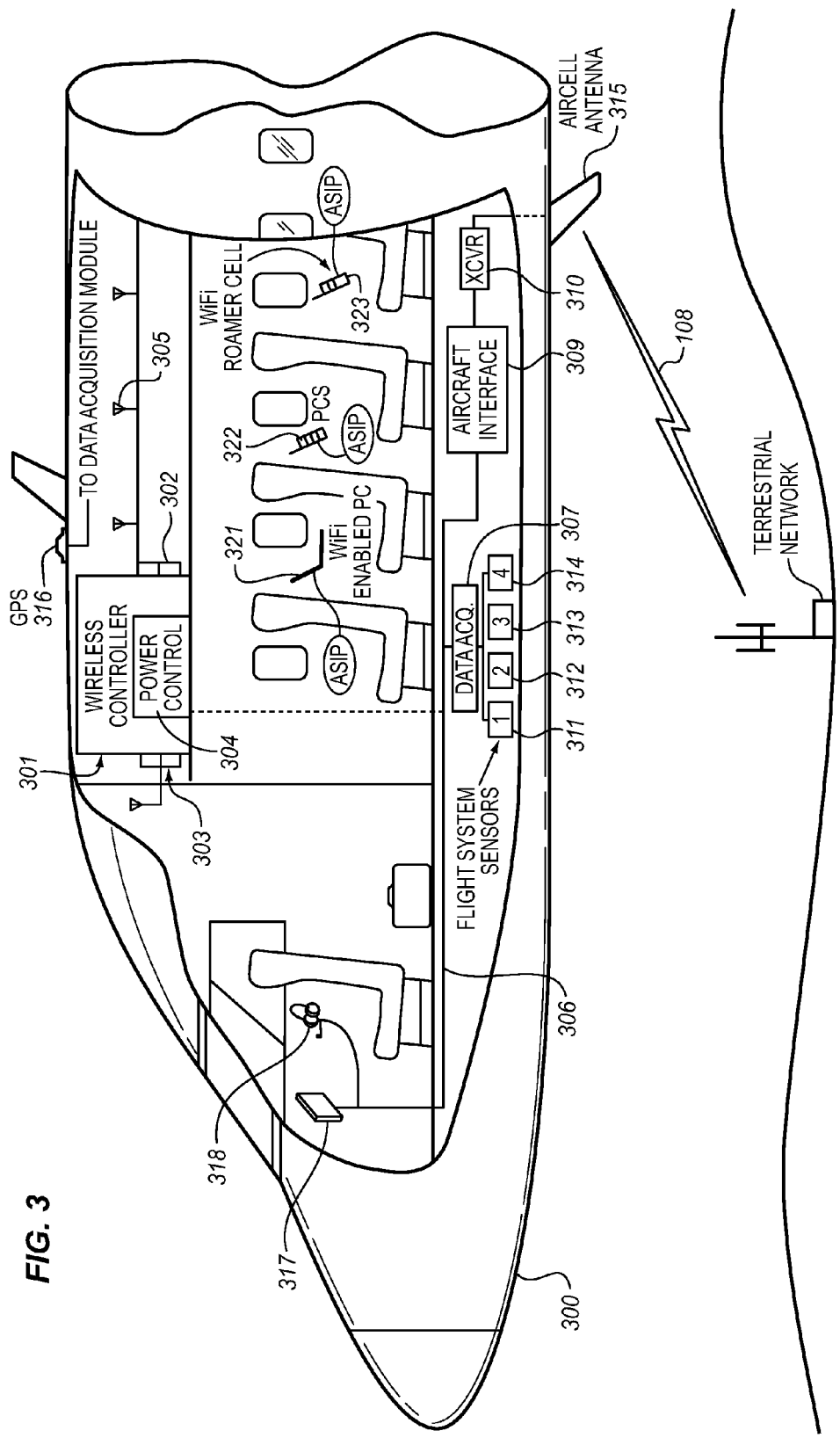
FIG. 3 illustrates an implementation of the Aircraft Wireless Network.

FIG. 3 illustrates, in block diagram form, the architecture of a typical aircraft-based network for wireless subscriber devices in a multi-passenger commercial aircraft 300. This system comprises a plurality of elements used to implement a communication backbone that is used to enable wireless communication for a plurality of wireless subscriber devices of diverse nature. The aircraft-based network for wireless subscriber devices comprises a Local Area Network 306 that includes a radio frequency communication system 301 that uses a spread spectrum paradigm having a short range of operation. This Local Area Network 306 supports packet switched connections from wireless subscriber devices 321-323 and interconnects the communications of these wireless subscriber devices 321-323 via a gateway 310 to the Internet 127 or Public Switched Data Network (PDSN). The wireless subscriber devices 321-323 include a diversity of communication devices, such as laptop computers 321, cellular telephones 322, MP3 music players (not shown), Personal Digital Assistants (PDA) (not shown), WiFi-based roamer cellular devices 323, and the like.

The basic elements of the aircraft-based network for wireless subscriber devices comprises at least one antenna 305 or means of coupling electromagnetic energy to/from the Aircraft Wireless Network 3 located within the aircraft 300 which serves to communicate with the plurality of wireless subscriber devices 321-323 located within the aircraft 300. The at least one antenna 305 is connected to a wireless controller 301 that encompasses a plurality of elements that serve to regulate the wireless communications with the plurality of wireless subscriber devices 321-323. The wireless controller 301 includes at least one low power radio frequency transceiver 302 for providing a low power radio frequency transceiver 303 which implements a data-based packet switched communication space using a wireless communication paradigm, such as WiFi. Finally, the wireless controller 301 includes a power control segment 304 that serves to regulate the power output of the plurality of wireless subscriber devices. It also serves to, by RF noise or jamming means, prevent wireless subscriber devices from directly and errantly accessing the ground network when in a non-terrestrial mode. The ultra-low airborne transmit power levels feature represents a control by the Power Control element 304 of the wireless controller 301 of the aircraft-based network for wireless subscriber devices to regulate the output signal power produced by the wireless subscriber devices 321-323 to minimize the likelihood of receipt of the non-terrestrial cellular signal by ground-based cell sites or ground-based subscriber devices.

It is obvious that these above-noted segments of the wireless controller 301 can be combined or parsed in various ways to produce an implementation that differs from that disclosed herein. The particular implementation described is selected for the purpose of illustrating the concept of the SIP Number Portability System and is not intended to limit the applicability of this concept to other implementations.

The wireless controller 301 is connected via a backbone Local Area Network 306 to a plurality of other elements which serve to provide services to the wireless subscriber devices 321-323. These other elements can include an Aircraft Interface 309 for managing switching routing aggregation functions for the communication transmissions of the wireless subscriber devices. A data acquisition element 307 serves to interface with a plurality of flight system sensors 311-314 and a Global Positioning System element 316 to collect data from a plurality of sources as described below. Furthermore, pilot communication devices, such as the display 317 and headset 318, are connected to this Local Area Network 306 either via a wired connection or a wireless connection.

Finally, a gateway transceiver 310 is used to interconnect the Aircraft Interface 309 to an antenna 315 to enable signals to be transmitted from the Aircraft Wireless Network 3 to transceivers located on the ground. Included in these components is a communications router function to forward the communication signals to the proper destination.

Voice Over Internet Protocol (VoIP) Communications

A Voice over Internet Protocol network is a class of networks that uses packetized data streams to carry voice across the packet-centric Internet Protocol (IP) network. In essence, voice becomes data. For VoIP to be a viable communication mode, the latency and packet delivery reliability must be of a sufficiently high standard that both distortion (missing packets) and delay (slow arriving packets) do not impair the customer's user experience in terms of call intelligibility, call reliability and call availability.

Session Initiation Protocol (SIP)

The Session Initiation Protocol (SIP) is a signaling protocol, widely used for setting up and tearing down multimedia communication sessions such as voice and video calls over the Internet. The protocol can be used for creating, modifying and terminating two-party (unicast) or multiparty (multicast) sessions consisting of one or several media streams. The SIP protocol is a TCP/IP-based Application Layer protocol and it is a text-based protocol, sharing many elements of the Hypertext Transfer Protocol (HTTP). SIP employs design elements similar to HTTP-like request/response transaction model. Each transaction consists of a client request that invokes a particular method, or function, on the server and at least one response. Session Initiation Protocol reuses most of the header fields, encoding rules and status codes of HTTP, providing a readable text-based format.

Session Initiation Protocol is a peer-to-peer protocol, thus it requires only a simple (and thus scalable) core network with intelligence distributed to the network edge, embedded in endpoints (terminating devices built in either hardware or software). Session Initiation Protocol features are implemented in the communicating endpoints (i.e. at the edge of the network) contrary to traditional SS7 features, which are implemented in the network.

A Session Initiation Protocol User Agent (UA) is a logical network end-point used to create or receive SIP messages and thereby manage a SIP session. A Session Initiation Protocol User Agent can perform the role of a User Agent Client (UAC), which sends SIP requests, and in an analogous manner the User Agent Server (UAS), which receives the requests and returns a SIP response. These roles of User Agent Client and User Agent Server only last for the duration of a SIP transaction. Session Initiation Protocol's peer-to-peer nature does not enable network-provided services.

Operation of the SIP Number Portability System

FIG. 4 illustrates, in flow diagram form, the operation of the SIP Number Portability System to activate a call forwarding registration process which causes calls which are directed to the subscriber's publicly available phone number to be forwarded to the Airborne Session Initiated Protocol Client through a SIP-based Public Switched Telephone Network access number of the Airborne Wireless Communication Network and incoming communication sessions directed to the subscriber's wireless service provider user address are routed to the Airborne Session Initiated Protocol Client through a SIP-based data gateway of the Airborne Wireless Communication Network on the Internet or the Public Switched Data Network. On outbound calls, the Airborne Session Initiated Protocol Client populates the Calling Number field with the wireless subscriber device phone number so that caller ID display located at the called party's subscriber device shows the subscriber's publicly available phone number. The SIP Number Portability System includes the Airborne Session Initiated Protocol Client (ASIP) resident on the subscriber's wireless device, the SIP control software resident on the wireless controller 309, and the Aircraft PSTN Gateway 122 which connects to the Public Switched Telephone Network 126.

At step 401, the SIP Number Portability System is responsive to a dual mode (cellular and WiFi) wireless subscriber device, located on board the aircraft, being activated for establishing a communication session with the wireless subscriber device. At step 402, the SIP Number Portability System determines whether the wireless subscriber device is equipped with an Airborne Session Initiated Protocol Client.

If not, processing advances to step 403 where the wireless subscriber device and the SIP Number Portability System operate to download an instance of the Airborne Session Initiated Protocol Client on the wireless subscriber device. Processing then advances to step 404, as does processing from step 402 where the wireless subscriber device is already equipped with an Airborne Session Initiated Protocol Client, to initiate the call forwarding function for the wireless subscriber device.

At step 404, the Airborne Session Initiated Protocol Client located in the wireless subscriber device turns off the cellular radio in the subscriber wireless device, turns on the WiFi radio in the subscriber wireless device at step 405 and identifies the subscriber wireless device to the SIP Number Portability System, including the subscriber's publicly available phone number as well as the type of device, via the Aircraft Wireless Network 1 at step 406. This information is used by the SIP Number Portability System at step 407 to initiate a data communication session, via an aircraft-based gateway 309 and the Air-to-Ground Network 2, to the Airborne PSTN Gateway 122 which interfaces with the Public Switched Telephone Network 126. The Aircraft PSTN Gateway 122 enters the wireless subscriber device information into a database to maintain the correspondence between the subscriber's publicly available phone number and the VoIP number of the Airborne Session Initiated Protocol Client associated with this aircraft. The call, as dialed by the Airborne Session Initiated Protocol Client is then extended through the PSTN 126 to the subscriber's home serving cell site (not shown) at step 408, where the Airborne Session Initiated Protocol Client automatically activates a call forwarding feature at that site. At step 409, the SIP Number Portability System transmits: the subscriber's publicly available phone number, call forwarding feature activation codes, as well as the telephone number of the predetermined Airborne PSTN Gateway 122 which is connected to the Public Switched Telephone Network 126. This data causes the subscriber's home serving cell site at step 410 to activate the call forwarding feature for the subscriber's publicly available phone number. At step 411, an incoming call directed to subscriber's publicly available phone number is automatically forwarded by the subscriber's home serving cell site to the telephone number of the identified predetermined Aircraft PSTN Gateway 122 which is connected to the Public Switched Telephone Network 126. At step 411, the Aircraft PSTN Gateway 122 receives the incoming call with its associated identification of the number from which the call is forwarded and performs a table lookup, using the number from which the call is forwarded to extract the associated VoIP number and the aircraft identification from the table. The Aircraft PSTN Gateway 122 then extends this communication connection of the call forwarded call over the Air-To-Ground link 2 to the Aircraft based gateway 309, which serves the subscriber's wireless device, where the communication connection is completed via the Aircraft Network 1 at step 412 to the Airborne Session Initiated Protocol Client resident on the subscriber's mobile wireless device.

In order to provide transparency of this service, on outbound calls, the Airborne Session Initiated Protocol Client populates the Calling Number field with the wireless subscriber device phone number so that caller ID display located at the called party's subscriber device shows the subscriber's publicly available phone number. Similarly, the outbound data communication transmissions are populated with the subscriber's wireless service provider user address.

SUMMARY

The SIP Number Portability System activates a call forwarding registration process which causes calls to the subscriber's publicly available phone number to be forwarded to the Airborne Session Initiated Protocol Client through a SIP based Public Switched Telephone Network access number and incoming communication sessions directed to the subscriber's wireless service provider user address to be routed to the Airborne Session Initiated Protocol client through a SIP based data gateway on the Internet or the Public Switched Data Network.

What is claimed:

1. A wireless device number portability system which enables passengers' wireless devices operational onboard an aircraft to receive communications which are directed to their home communication address, comprising:
   number portability system, located on an aircraft and responsive to activation of a passenger's wireless device onboard the aircraft, for establishing a communication session with said passenger wireless device;
   Airborne Session Initiated Protocol Client, resident on the passenger wireless device and responsive to said communication session with said number portability system, for automatically identifying the passenger wireless device to the number portability, system;
   wherein said number portability system comprises:
      call forwarding activation process for automatically initiating communications with a home communication system which hosts the passenger's home communication address to activate call forwarding to said Airborne Session Initiated Protocol Client from the passenger's home communication address;
   ground-based Aircraft PSTN gateway, connected to a ground-based communication network, for extending communications received from the passenger's home communication system to said Airborne Session Initiated Protocol Client resident on said passenger wireless device; and
   Aircraft gateway, connected to a wireless network which serves said aircraft, for communicatively interconnecting said wireless network with said ground-based Aircraft PSTN gateway to extend said communications, forwarded to said ground-based Aircraft PSTN gateway by the passenger's home communication system, to said Airborne Session Initiated Protocol Client resident on said passenger wireless device via said wireless network.

2. The wireless device number portability system of claim 1 wherein said number portability system comprises:
   SIP client downloader which automatically loads a SIP client on to said passenger wireless device.

3. The wireless device number portability system of claim 2 wherein said ground-based Aircraft PSTN gateway comprises:
   call forwarding interface for transmitting the passenger's publicly available phone number, call forwarding feature activation codes, as well as the telephone number of said ground-based Aircraft PSTN gateway to said passenger's home communication system.

4. The wireless device number portability system of claim 1 wherein said ground-based Aircraft PSTN gateway comprises:
   telephone number translator which is responsive to communications forwarded from the passenger's home communication system, for translating the telephone number transmitted by the passenger's home communication system into an identification of said passenger wireless device and said aircraft in which said passenger wireless device is located.

5. The wireless device number portability system of claim 4 wherein said ground-based Aircraft PSTN gateway further comprises:
- router for transmitting said communications forwarded from the passenger's home communication system and said identification of said passenger wireless device to said wireless network which serves said aircraft for connection to said Airborne Session Initiated Protocol Client resident on said passenger wireless device.

6. The wireless device number portability system of claim 1 wherein said Airborne Session Initiated Protocol Client comprises:
- protocol selector for disabling a cellular radio located in the passenger wireless device and activating a wireless network interface located in the passenger wireless device.

7. A method of operating a wireless device number portability system which enables passenger wireless devices operational onboard an aircraft to receive communications directed to their home communication address, comprising:
- automatically initiating communications from an Airborne Session Initiated Protocol Client resident on the passenger wireless device, responsive to said passenger wireless device being operational in an aircraft, with a home communication system which hosts the passenger's home communication address to activate call forwarding from the home communication address;
- extending communications from an Aircraft PSTN gateway which is connected to a ground-based communication network, that are forwarded from the passenger's home communication system to said Airborne Session Initiated Protocol Client resident on said wireless device;
- wherein said Airborne Session Initiated Protocol Client automatically activates call forwarding to said Aircraft PSTN gateway; and
- communicatively interconnecting an Aircraft gateway which is connected to a wireless network which serves said aircraft with said Aircraft PSTN gateway to extend said communications forwarded from the passenger's home communication system to said Airborne Session Initiated Protocol Client resident on said passenger wireless device via said wireless network.

8. The method of operating a wireless device number portability system of claim 7 wherein said step of automatically initiating communications comprises:
- automatically loading a SIP client on to said passenger wireless device.

9. The method of operating a wireless device number portability system of claim 8 wherein said step of communicatively interconnecting comprises:
- transmitting the passenger's publicly available phone number, call forwarding feature activation codes, as well as the telephone number of said Aircraft PSTN gateway connected to the Public Switched Telephone Network to said passenger's home communication system.

10. The method of operating a wireless device number portability system of claim 7 wherein said step of extending communications comprises:
- translating, in response to communications forwarded from the passenger's home communication system, the telephone number transmitted by the passenger's home communication system into an identification of said passenger wireless device and said aircraft in which said passenger wireless device is located.

11. The method of operating a wireless device number portability system of claim 10 wherein said step of extending communications further comprises:
- transmitting said communications forwarded from the passenger's home communication system and said identification of said passenger wireless device to said wireless network which serves said aircraft for connection to said Airborne Session Initiated Protocol Client resident on said passenger wireless device.

12. The method of operating a wireless device number portability system of claim 7 wherein said step of automatically initiating communications comprises:
- disabling a cellular radio located in the passenger wireless device and activating a wireless network interface located in the passenger wireless device.

* * * * *